US008768099B2

(12) United States Patent
Derrenberger et al.

(10) Patent No.: US 8,768,099 B2
(45) Date of Patent: Jul. 1, 2014

(54) METHOD, APPARATUS AND SYSTEM FOR ALTERNATE IMAGE/VIDEO INSERTION

(75) Inventors: Mike Arthur Derrenberger, Hopkinton, MA (US); Robert Eugene Trzybinski, Woodstock, IL (US)

(73) Assignee: Thomson Licensing, Issy les Moulineaux (FR)

( * ) Notice: Subject to any disclaimer, the term of this patent is extended or adjusted under 35 U.S.C. 154(b) by 1525 days.

(21) Appl. No.: 11/921,602

(22) PCT Filed: Jun. 8, 2005

(86) PCT No.: PCT/US2005/020229
§ 371 (c)(1),
(2), (4) Date: May 4, 2010

(87) PCT Pub. No.: WO2006/135358
PCT Pub. Date: Dec. 21, 2006

(65) Prior Publication Data
US 2010/0278450 A1    Nov. 4, 2010

(51) Int. Cl.
*G06K 9/20*    (2006.01)
(52) U.S. Cl.
USPC ........... 382/294; 382/282; 382/283; 382/284; 382/291; 382/299; 348/586
(58) Field of Classification Search
USPC .................................................. 382/276–298
See application file for complete search history.

(56) References Cited

U.S. PATENT DOCUMENTS

| | | | | |
|---|---|---|---|---|
| 3,682,540 A | * | 8/1972 | Oxberry et al. ................. | 355/18 |
| 4,249,805 A | * | 2/1981 | Hilbert et al. .................. | 352/85 |
| 4,794,460 A | * | 12/1988 | Shiota ........................... | 386/230 |
| 4,972,494 A | * | 11/1990 | White et al. ................... | 382/143 |
| 5,264,837 A | | 11/1993 | Buehler | |
| 5,681,223 A | * | 10/1997 | Weinreich ...................... | 472/61 |

(Continued)

FOREIGN PATENT DOCUMENTS

| | | |
|---|---|---|
| AU | 9348848 | 5/1994 |
| CA | 2453056 | 1/2003 |

(Continued)

OTHER PUBLICATIONS

International Search Report dated Feb. 22, 2006.

(Continued)

*Primary Examiner* — Jayesh A Patel
*Assistant Examiner* — Iman K Kholdebarin
(74) *Attorney, Agent, or Firm* — Robert D. Shedd; Kuniyuki Akiyama (57) ABSTRACT

The present invention provides a method, apparatus and system of content creation, content post processing, new image capture and image composition whereby alternate images or video content may be selectively integrated into an original video in real time. In the present invention, sufficient metadata is created at the time of the creation of the original video content to both describe objects/areas in the original video that are available for integration of alternate images/video and to provide a means of controlling the alternate video capture and processing to fit the alternate image/video into the areas in the original video defined as available for integration of alternate image/video. The result is a mechanism whereby personal/alternate video/images may be integrated with existing video content, such as in one embodiment, music videos (e.g., video Karaoke), games, broadcast video, DVD videos, and the like, in real time.

11 Claims, 6 Drawing Sheets

(56) References Cited

U.S. PATENT DOCUMENTS

| | | | |
|---|---|---|---|
| 5,764,306 A | 6/1998 | Steffano | |
| 6,072,537 A * | 6/2000 | Gurner et al. | 348/586 |
| 6,100,925 A * | 8/2000 | Rosser et al. | 348/169 |
| 6,134,345 A * | 10/2000 | Berman et al. | 382/162 |
| 6,308,016 B1 | 10/2001 | Desormeaux et al. | |
| 6,400,374 B2 * | 6/2002 | Lanier | 345/630 |
| 6,476,874 B1 * | 11/2002 | Ito et al. | 348/586 |
| 6,498,618 B2 | 12/2002 | Wilson et al. | |
| 6,559,884 B1 | 5/2003 | Tamir et al. | |
| 6,714,249 B2 * | 3/2004 | May et al. | 348/373 |
| 6,778,207 B1 | 8/2004 | Lee | |
| 6,906,744 B1 * | 6/2005 | Hoshuyama et al. | 348/223.1 |
| 6,909,743 B1 * | 6/2005 | Ward et al. | 375/240.01 |
| 7,084,876 B1 * | 8/2006 | Fogel et al. | 345/473 |
| 7,230,653 B1 * | 6/2007 | Overton et al. | 348/584 |
| 7,268,834 B2 * | 9/2007 | Lundberg et al. | 348/590 |
| 7,304,667 B2 * | 12/2007 | Watanabe et al. | 348/221.1 |
| 7,324,166 B1 * | 1/2008 | Joslin et al. | 348/722 |
| 7,342,570 B2 * | 3/2008 | Lin et al. | 345/166 |
| 7,639,387 B2 * | 12/2009 | Hull et al. | 358/1.18 |
| 7,697,787 B2 * | 4/2010 | Illsley | 382/295 |
| 7,756,349 B2 * | 7/2010 | Izawa | 382/239 |
| 7,936,336 B2 * | 5/2011 | Lin et al. | 345/166 |
| 8,009,198 B2 | 8/2011 | Alhadef | |
| 8,205,154 B2 * | 6/2012 | Doepke et al. | 715/255 |
| 2001/0055414 A1 * | 12/2001 | Thieme | 382/135 |
| 2002/0005891 A1 | 1/2002 | Wilson et al. | |
| 2003/0007700 A1 * | 1/2003 | Gutta et al. | 382/282 |
| 2003/0159153 A1 * | 8/2003 | Falvo et al. | 725/110 |
| 2004/0004626 A1 | 1/2004 | Takashi et al. | |
| 2004/0264767 A1 * | 12/2004 | Pettigrew | 382/162 |
| 2005/0157202 A1 * | 7/2005 | Lin et al. | 348/362 |
| 2005/0212817 A1 * | 9/2005 | Cannon et al. | 345/619 |
| 2006/0221187 A1 | 10/2006 | Alhadef | |
| 2007/0027844 A1 * | 2/2007 | Toub et al. | 707/3 |
| 2007/0099699 A1 * | 5/2007 | Plotkin | 463/30 |
| 2007/0263119 A1 * | 11/2007 | Shum et al. | 348/371 |
| 2008/0123950 A1 * | 5/2008 | Matsushita et al. | 382/167 |
| 2008/0260346 A1 * | 10/2008 | Sukeda et al. | 386/46 |
| 2010/0027961 A1 * | 2/2010 | Gentile et al. | 386/52 |
| 2010/0031149 A1 * | 2/2010 | Gentile et al. | 715/723 |
| 2010/0278450 A1 * | 11/2010 | Derrenberger et al. | 382/284 |
| 2011/0211749 A1 * | 9/2011 | Tan et al. | 382/154 |
| 2012/0023456 A1 * | 1/2012 | Sun et al. | 715/863 |
| 2012/0308211 A1 * | 12/2012 | Xu et al. | 386/281 |
| 2013/0094780 A1 * | 4/2013 | Tang et al. | 382/284 |
| 2013/0236160 A1 * | 9/2013 | Gentile et al. | 386/248 |

FOREIGN PATENT DOCUMENTS

| | | |
|---|---|---|
| CN | 1393096 | 1/2003 |
| CN | 1150755 C | 5/2004 |
| EP | 0595700 | 5/1994 |
| EP | 0 920 212 A2 | 6/1999 |
| EP | 0924648 | 8/2004 |
| FR | 2826130 | 6/2001 |
| FR | 2854301 | 10/2004 |
| JP | 61252780 | 11/1986 |
| JP | 6292052 | 10/1994 |
| JP | 7240897 | 12/1995 |
| JP | Hei 10-150585 | 6/1998 |
| JP | 1153521 | 2/1999 |
| JP | 200255640 | 2/2002 |
| JP | 2002135565 | 5/2002 |
| JP | 2002232782 | 8/2002 |
| JP | 200438746 | 2/2004 |

OTHER PUBLICATIONS

3D Imaging in the Studio (and Elsewhere . . . ) G.J. Iddan & G. Yahav 3DV Systems Ltd., Yokneam, Israel www.3dvsystems.com.il.

* cited by examiner

METHOD, APPARATUS AND SYSTEM FOR ALTERNATE IMAGE/VIDEO INSERTION

This application claims the benefit, under 35 U.S.C. §365 of International Application PCT/US2005/020229 filed Jun. 8, 2005, which was published in accordance with PCT Article 21(2) on Dec. 21, 2006 in English

TECHNICAL FIELD

This invention relates to video systems, and more particularly, to a method, apparatus and system for inserting alternate image/video into an existing video.

BACKGROUND ART

Means for merging two or more video signals to provide a single composite video signal is known in the art. An example of such video merging is presentation of weather-forecasts on television, where a weather-forecaster in the foreground is superimposed on a weather-map in the background.

Such prior-art means normally use a color-key merging technology in which the required foreground scene is recorded using a colored background (usually blue or green). The required background scene is also recorded. In its simplest form, the color-key video merging technique uses the color of each point in the foreground scene to automatically "hard" switch (i.e., binary switch) between the foreground and background video signal. The color-key video merging technique uses the color of each point in the foreground scene to automatically switch between the foreground and background video signal. In particular, if a blue pixel is detected in the foreground scene (assuming blue is the color key), then a video switch will direct the video signal from the background scene to the output scene at that point. If a blue pixel is not detected in the foreground scene, then the video switch will direct the video from the foreground scene to the output scene at that point. After all points have been processed in this way, the result is an output scene which is a combination of the input foreground and background scenes.

In more complex forms of the color-key video merging technique, the effects of switching may be hidden and more natural merging may be achieved. For instance, shadows of foreground subjects may be made to appear in the background.

The color-key merging technique is simple, and cheap hardware for this method has been available for some time. As a result, color-key insertion can be performed on both recorded and live video. It is used widely in live television for such purposes as superimposing sports results or images of reporters on top of background scenes, and in the film industry for such purposes as superimposing foreground objects (like space-ships) onto background scenes (like space-scenes).

However, there are two important limitations of color-key merging technology. First, this technique cannot be used to combine video sources where the separation color (e.g., blue or green) in the scene cannot be controlled by the employer of this technology. This has often limited the use of color-key insertion to image sequences recorded in a broadcasting or film studio. Second, it is not currently possible to automatically combine video signals in such a way that patterns inserted from one sequence follow the motion of objects (foreground or background) in the other sequence so that the inserted patterns appear to be part of these objects. While, in the past, synchronization of the motions of background and foreground scenes has been performed manually in a very limited number of film productions, such manual synchronization is highly expensive and tedious and requires that the video material be prerecorded and not 'live'.

BRIEF SUMMARY OF THE INVENTION

The present invention addresses the deficiencies of the prior art by providing a method, apparatus and system for alternate image/video insertion.

In one embodiment of the present invention, a method for alternate image insertion includes storing metadata regarding a capture of a first video content, the first video content having identified areas that are able to be replaced with alternate image/video content, capturing an alternate image/video using the stored metadata associated with the first video content, and scaling the captured alternate image/video such that the alternate image/video is able to be integrated into a predetermined area of the first video content.

In an alternate embodiment of the present invention, a system for alternate image insertion includes at least one imaging device for capturing images/video, and a processing and control unit including a processor and a memory, where the processing and control unit is adapted to store metadata regarding a capture of a first video content, the first video content having identified areas that are able to be replaced with alternate image/video content, to post process the first video content to create new metadata describing a time-stamped matte for areas in the first video content capable of being replaced, to capture an alternate image/video using the stored metadata associated with the capture of the first video content, and to scale the captured alternate image/video such that the alternate image/video is able to be integrated into a predetermined area of the first video content.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention advantageously provides a method, apparatus and system for image composition whereby alternate image or video content may be selectively inserted into an original video in real time. Although the present invention will be described primarily within the context of an Alternate. Image/Video Insertion Process system comprising cameras for performing imaging, it will be appreciated by those skilled in the relevant art, informed by the teachings of the present invention that the concepts of the present invention may be applied to systems implementing substantially any imaging devices. Furthermore, although throughout the teachings of the invention herein, the aspects of the invention are and will be described with respect to merging the images of objects, it should be understood that the term objects as used herein should be interpreted to represent videos, images and the like. As such, it should be understood that the teachings of the present invention herein are directed, at least in part, to the insertion of an image(s), video(s) and the like, such as computer generated animation, into an existing image(s), video(s) and the like, such as other computer generated animation.

Figure 1:
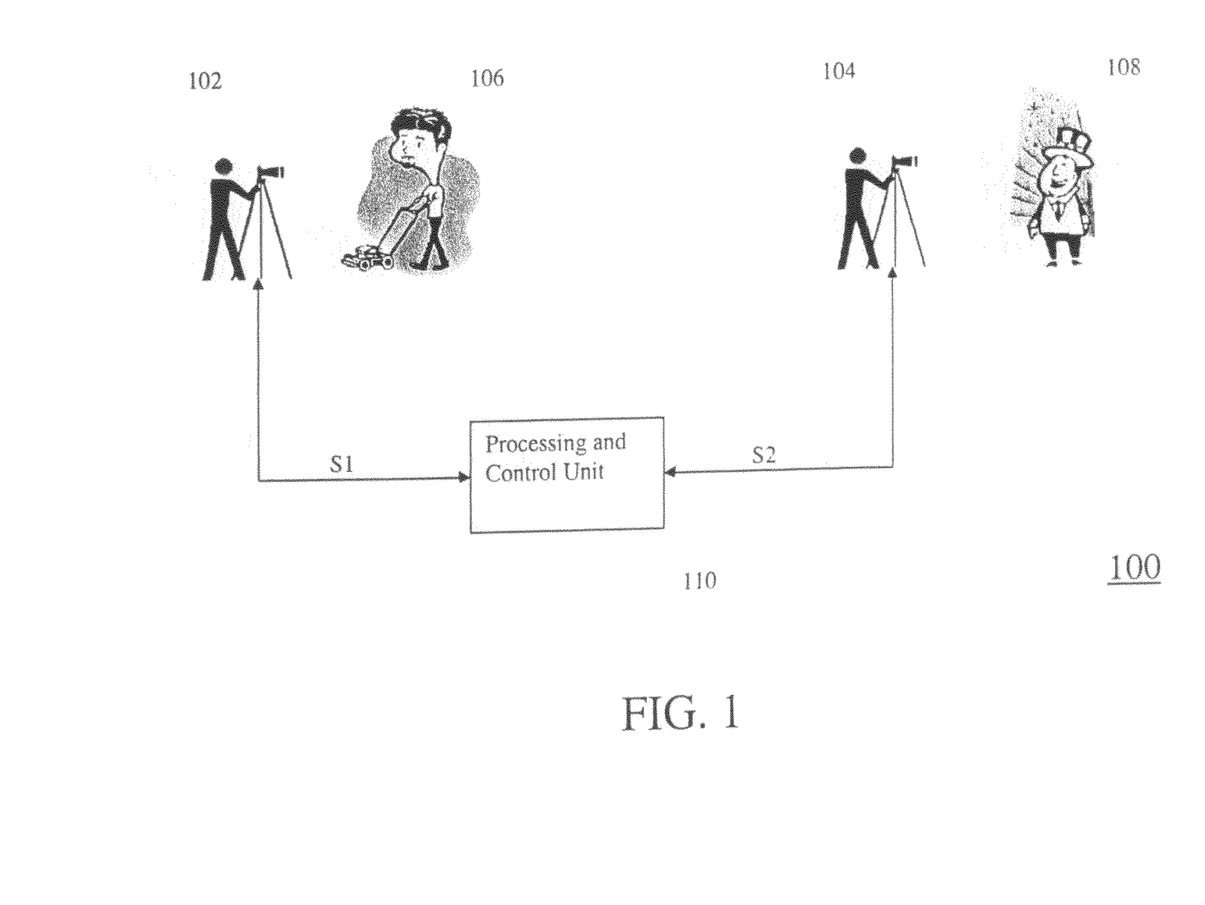
FIG. 1 depicts a high level block diagram of an Alternate Image/Video Insertion Process (AIVIP) system in accordance with an embodiment of the present invention.

FIG. 1 depicts a high level block diagram of an Alternate Image/Video Insertion Process (AIVIP) system in accordance with an embodiment of the present invention. The AIVIP system 100 of FIG. 1 illustratively comprises a source imaging device (illustratively a first camera) 102, a secondary imaging device (illustratively a second camera) 104, and a processing and control unit 110. FIG. 1 further illustrates a source object 106 to be imaged and a secondary object 108 to be imaged and integrated into the first imaged object. The source imaging device 102 and the secondary imaging device 104 may comprise any devices capable of imaging an object, such as a camera and the like. Although the AIVIP system 100 of FIG. 1 illustratively comprises a source imaging device 102 and a secondary imaging device 104, in alternate embodiments of the present invention, an AIVIP system in accordance with the present invention may comprise a single imaging device for imaging both a source object and a secondary object.

Figure 2:
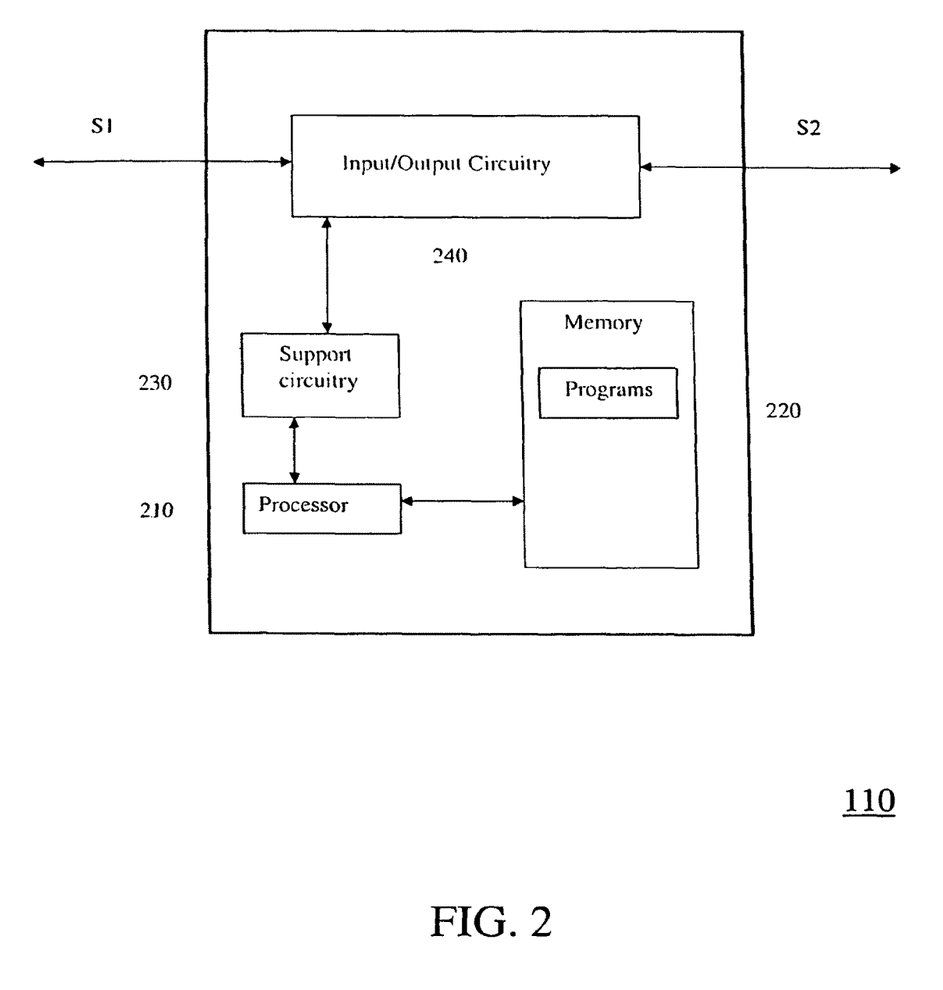
FIG. 2 depicts a high level block diagram of an embodiment of a processing and control unit suitable for use in the AIVIP system 100 of FIG. 1.

FIG. 2 depicts a high level block diagram of an embodiment of a processing and control unit 110 suitable for use in the AIVIP system 100 of FIG. 1. The processing and control unit 110 of FIG. 2 comprises a processor 210 as well as a memory 220 for storing control programs, stored images and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The processing and control unit 110 also contains input-output circuitry 240 that forms an interface between the various functional elements communicating with the processing and control unit 110. For example and as depicted in FIG. 1, the control unit 110 communicates with the source imaging device 102 via a first path S1 and communicates with a secondary imaging device 104 via a second path S2.

Although the processing and control unit 110 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In accordance with the present invention, in the AIVIP system 100 of FIG. 1, alternate images or video content may be selectively integrated into an original video in real time. That is, in an AIVIP system of the present invention, such as the AIVIP system 100 of FIG. 1, sufficient metadata is created and stored at the time of the creation of an original video content to both describe objects/areas in the original video that are available for integration of alternate images/video and to provide a means of controlling the alternate video capture and processing to fit the alternate image/video into the areas in the original video defined as available for integration of alternate image/video.

Figure 3:
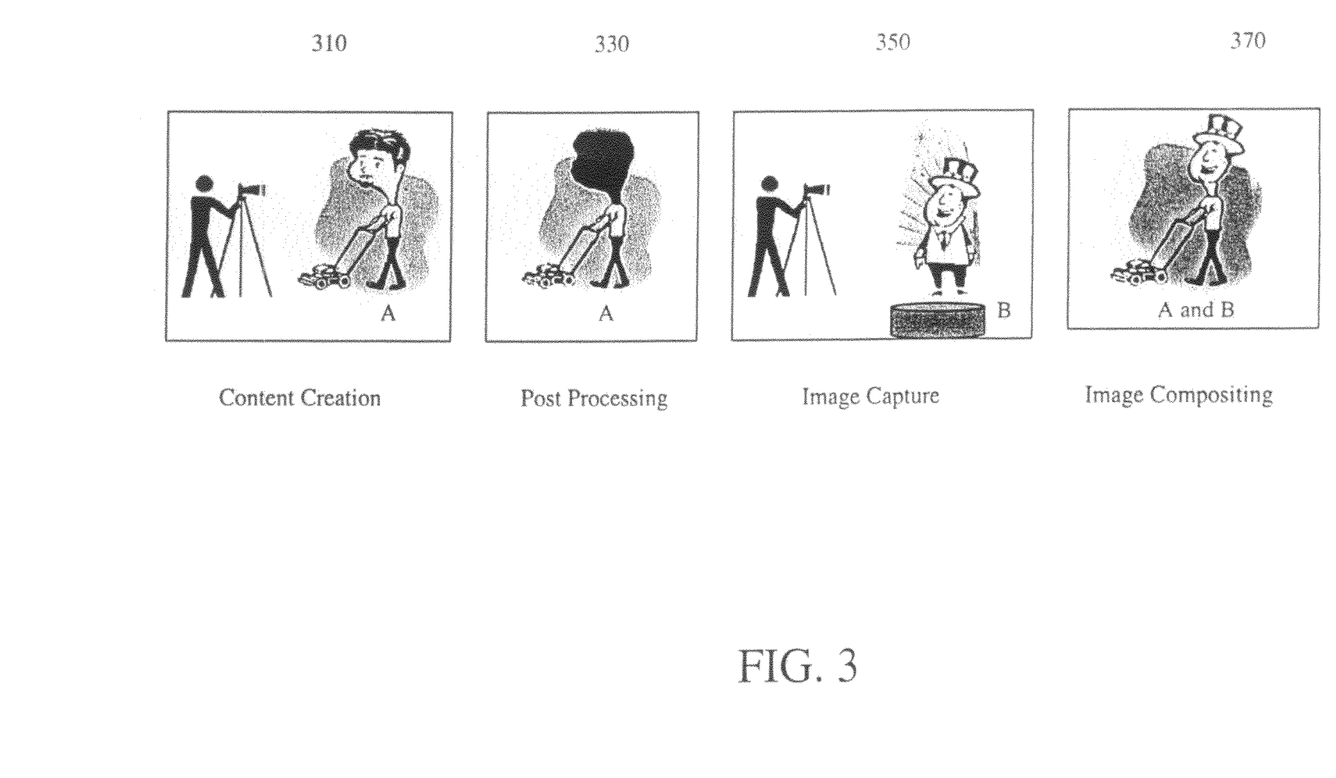
FIG. 3 depicts a high level functional block diagram of the processes of the AIVIP system of FIG. 1.

FIG. 3 depicts a high level functional block diagram of the processes of the AIVIP system 100 of FIG. 1. More specifically, FIG. 3 illustratively comprises a Content Creation process block 310, a Post Processing process block 330, an Alternate Video/Image Capture process block 350, and a Final Image Composition process block 370.

During the Content Creation process 310 of the AIVIP 100 system of FIG. 1, details regarding the positioning of the source camera 102 during image capture and environmental conditions surrounding the source camera 102 during image capture are recorded and time-stamped. Similarly, the relative positioning of the imaged object 106 is also recorded and respectively time-stamped. That is, in the AIVIP system 100 of the present invention, metadata regarding the positioning of the imaged object 106, the angle and positioning of the object 106 relative to the camera 102, the placement/angle of the camera 102, lighting position and intensity, and the like are recorded and time-stamped. Further, because the objects of interest is able to be determined in advance of their characteristics such as physical dimensions, articulation points, color content and shape, contours may be recorded near the time (or at the same time) as the general image capture. Further, physical information can also be collected about objects which might occlude the object of interest. All of this information provides pertinent information to the post production process to allow segmentation/separation of the objects of interest from the surrounding background.

During the Post Processing process 330 the original content is post processed to create new metadata to describe the time-stamped matte for each object of interest. That is for example, the location of the predefined areas in the original video content that are able to be replaced with alternate image content are identified and their position in the original video content recorded by, for example, the time they appear in the original video content. In addition, new metadata is created for the time-stamped information as described above. The object, camera, and matte metadata are used to control the positioning of the second camera 104 relative to the second object 108. Using specific information about the object's physical characteristics and its distance/relative position from the camera, it is possible to determine the boundary of the object of interest from other elements in the video capture. With the object boundary, it is now possible to create a matte which can be used to recover the object independent from the background or to remove the object for downstream insertion.

In the Alternate Video/image Capture process 350, an image of the second object 108 is then captured using the second camera 104 and the information for the positioning of the second object 108 and the second camera 104 determined in the Post Processing process 330. More specifically, during the Alternate Video/Image Capture process 350, the relative position of the second camera 104 to the second object 108, the environmental factors (e.g., the lighting, the temperature, etc.), and the like are controlled such that the conditions for the second camera 104 to take an image of the second object 108 are substantially the same as the conditions for when the first camera 102 took the image of the first object 106. In various embodiments of the present invention, the image of the second object 108 may be captured using a color-key merging technology in which the second object 108, a portion of which or which is to be totally combined with a first object 104, is recorded using a colored background (usually blue or green). In such embodiments of the present invention, the color-key video merging technique uses the color of each point in the foreground scene to automatically "hard" switch (i.e., binary switch) between the inserted object and the original object. The color-key video merging technique uses the color of each point in object to be inserted to automatically merge the object to be inserted with the source object.

In alternate embodiments of the present invention the image of the second object 108 may be captured using a camera or technique that in addition to RGB information, communicates an additional parameter indicating distance. That is in such an embodiment of the present invention, the camera or technique is capable of generating 3 dimensional images of the field of view (FOV) when looking from a single vantage point. The unique camera is capable of doing so at video rate and is compatible with all existing standards and formats. The concept of operation is based on generating a "light wall" having a proper width moving along the FOV. The light wall can be generated, for example, as a square laser pulse of short duration having a field of illumination (FOI) equal to the FOV. As the light wall hits the objects in the FOV, it is reflected back towards the camera carrying an imprint of the objects. The imprint contains all the information required for the reconstruction of the depth map.

Figure 4:
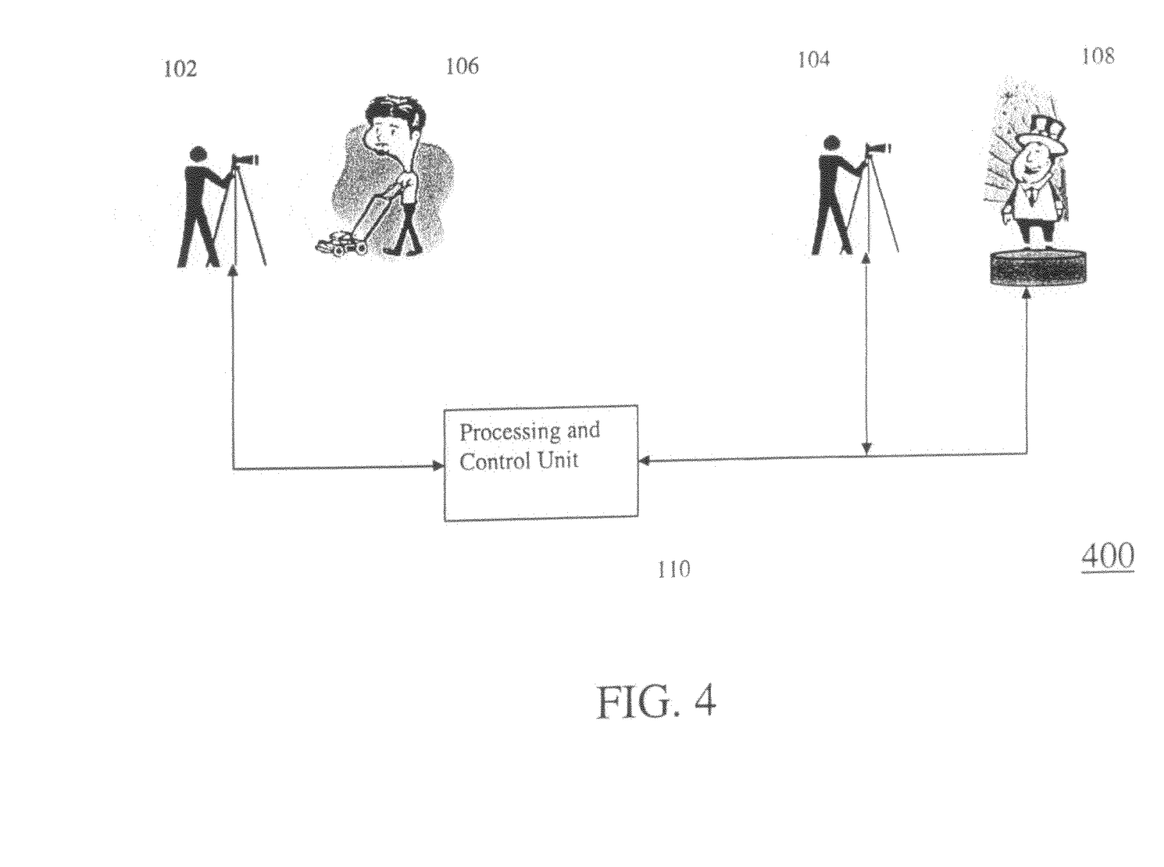
FIG. 4 depicts a high level block diagram of an AIVIP system of the present invention, where the positioning of the second object relative to the second camera is controlled by the processing and control unit.

In one embodiment of the present invention, the positioning of the second object 108 is controlled by the processing and control unit 110. For example, FIG. 4 depicts a high level block diagram of an AIVIP system 400 of the present invention, such as the AIVIP system of FIG. 1, where the positioning of the second object 108 relative to the second camera is controlled by the processing and control unit 110. That is and as depicted in the embodiment of the present invention of FIG. 4, the second camera 104 is fixed and the second object 108 is located on a movable device 112 (e.g., a movable stage) such that the second object may be positioned (e.g., rotated, raised, lowered, angled, etc) by the processing and control unit 110 to put the second camera 104 and the second object 108 in the proper relative positioning as the positioning between the first camera 102 and the first object 106 when the first camera 102 captured the image of the first object 106. That is, the movement of the second object 108 is controlled by the processing and control unit 110 using the metadata recorded during the Content Creation process 310.

Figure 5:
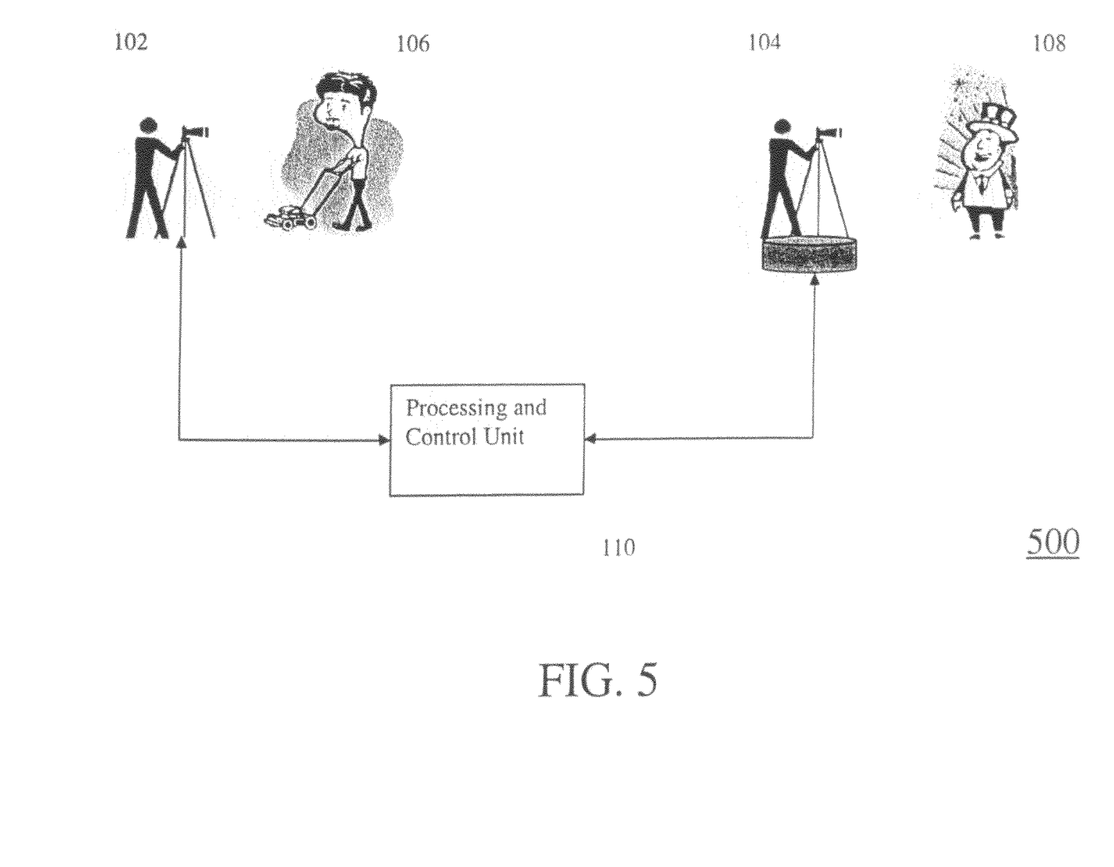
FIG. 5 depicts a high level block diagram of an AIVIP system of the present invention where the positioning of the second camera relative to the second object is controlled by the processing and control unit.

In an alternate embodiment of the present invention, the positioning of the second camera 104 is controlled by the processing and control unit 110. For example, FIG. 5 depicts a high level block diagram of an AIVIP system 500 of the present invention, such as the AIVIP system of FIG. 1, where the positioning of the second camera 104 relative to the second object 108 is controlled by the processing and control unit 110. That is and as depicted in the embodiment of the present invention of FIG. 5, the second object 108 is fixed and the second camera 104 is positioned (e.g., rotated, raised, lowered, angled, etc.) by the processing and control unit 110 to put the second camera 104 and the second object 108 in the proper relative positioning as the positions of the first camera 102 and the first object 106 when the first camera 102 captured the image of the first object 106. That is, the movement of the second camera 104 is controlled by the processing and control unit 110 using the metadata recorded during the Content Creation process 310. As depicted in FIG. 5, the second camera 104 may be located on a movable device 112 (e.g., a movable stage) such that the second camera 104 may be positioned (e.g., rotated, raised, lowered, angled, etc.) by the processing and control unit 110.

Even further, in alternate embodiments of the present invention, the positioning of either the second camera 104 or the second object 108, or any combination thereof are controlled by the processing and control unit 110 to put the second camera 104 and the second object 108 in the proper relative positioning as the positions of the first camera 102 and the first object 106 when the first camera 102 captured the image of the first object 106.

Optionally, in any of the embodiments of the present invention, the processing and control unit 110 may be further adapted to control other conditions that may affect the imaging process, such as lighting, temperature and the like, such that the processing and control unit 110 is able to substantially emulate the imaging conditions of when the first camera 102 captured the image of the first object 106 for an instance when the second camera 104 captures the image of the second object 108 to be inserted into the original image.

Referring back to FIG. 1 and FIG. 3, in the Final Image Composition process block 370, once the new image/video is captured it is scaled and appropriately modified so that it is able to be integrated into the matte created from the original video. The scaling/modification process is a "best fit" process. That is, variations in between contours of the image to be inserted and the matte prevent an exact match. Consequently, the image to be inserted is proportionally scaled to "cover" as much of the matte area as possible. After image composition, those areas where the matte still appears in the final composite image, the matte elements, are replaced by "cloning" adjacent background pixels. As depicted in FIG. 3, the final image/video comprises a combination of the original image/video and the subsequently captured alternate image/video.

Figure 6:
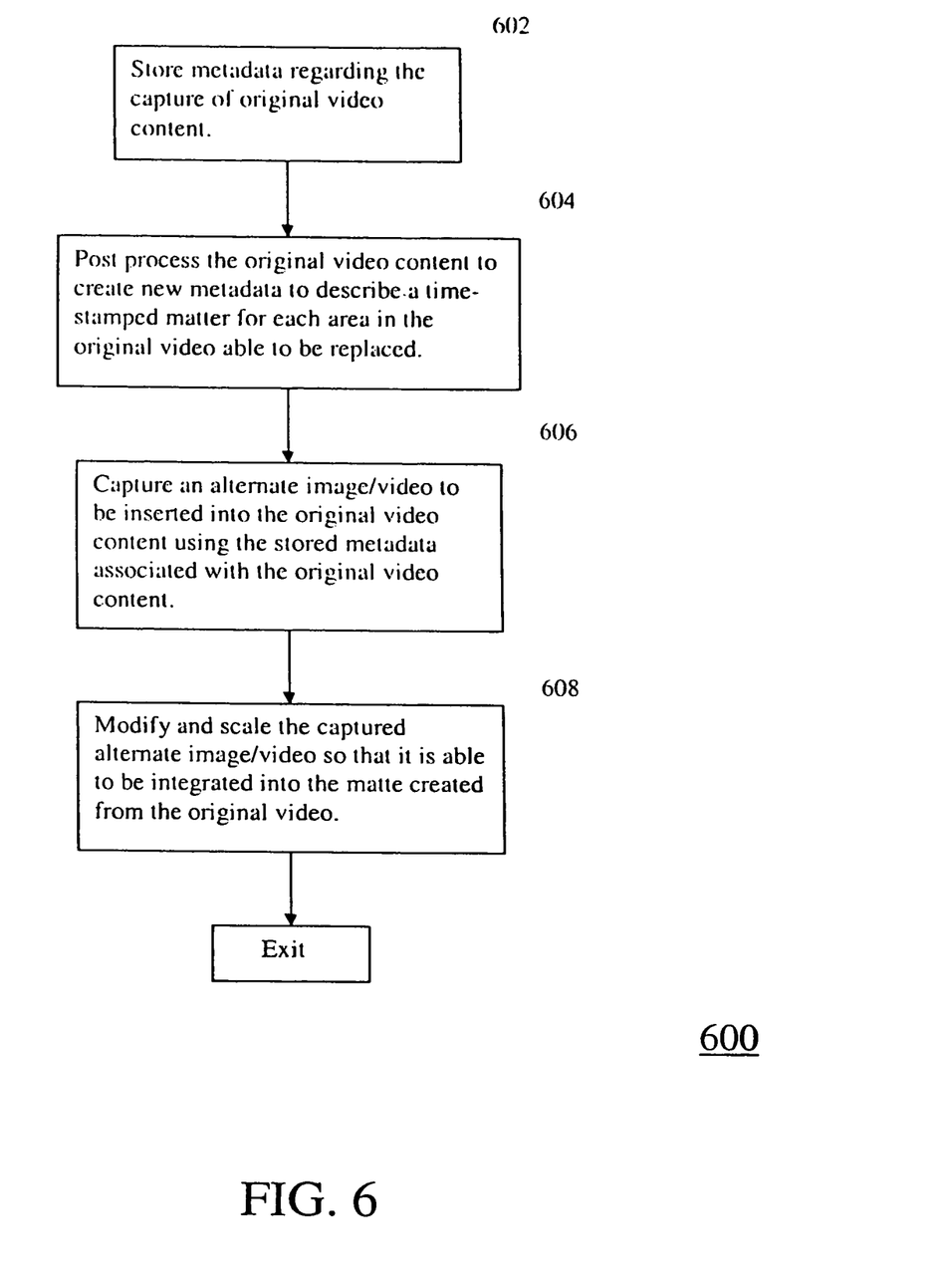
FIG. 6 depicts a flow diagram of a method of alternate video insertion in accordance with an embodiment of the present invention.

FIG. 6 depicts a flow diagram of a method of alternate video insertion in accordance with an embodiment of the present invention. The method 600 of FIG. 6 is entered at step 602 where metadata regarding the capture of original video content is stored, the video content having identified areas that are able to be replaced with alternate image/video content. The method 600 then proceeds to step 604.

At step 604, the original video content is processed to create a time-stamped matte for each area in the original video able to be replaced. The method 600 then proceeds to step 606.

At step 606, an alternate image/video to be inserted into the original video content is captured using the stored metadata identifying the original video content. The method 600 then proceeds to step 608.

At step 608, the captured alternate image/video is scaled and appropriately modified so that it is able to be integrated into the matte created from the original video. The method 600 is then exited.

While the forgoing is directed to various embodiments of the present invention, other and further embodiments of the invention may be devised without departing from the basic scope thereof. As such, the appropriate scope of the invention is to be determined according to the claims, which follow.

What is claimed:

1. A method for alternate image insertion, comprising:
   storing metadata associated with a capture of predefined areas of a first video content that are able to be replaced with alternate image content;
   capturing an alternate image using the stored metadata associated with the first video content;
   scaling the captured alternate image for integration into at least one of the predefined areas of the first video content;

replacing at least one of said predefined areas of said first video content with said scaled alternate image; and replacing a remaining matte area within said one of said predefined areas of said first video content by cloning adjacent background pixels for preventing variations in between contours of said scaled alternate image and said matte area, said metadata including at least one of time-stamped information regarding the positioning of imaged objects of predefined areas in the first video content, the angle and positioning of the imaged objects relative to an imaging device, the placement and angle of the imaging device, environmental conditions, and lighting position and intensity during imaging of the of predefined areas of the first video content, such that said alternate image is captured using the same parameters as a predefined area of said first video content it is to replace, said metadata further including time-stamped information for each of the predefined areas in the first video content able to be replaced with alternate image content.

2. The method of claim 1, wherein said step of capturing an alternate image comprises controlling the positioning of an imaged object according to the stored metadata associated with the capture of said first video content, when capturing the alternate image.

3. The method of claim 1, wherein said step of capturing an alternate image comprises controlling the positioning of an imaging device according to the stored metadata associated with the capture of said first video content, when capturing the alternate image.

4. An apparatus for alternate image insertion, comprising a processor and a memory, said apparatus configured to perform the steps of:

storing metadata associated with a capture of predefined areas of a first video content that are able to be replaced with alternate image content;

capturing an alternate image using the stored metadata associated with the first video content;

scaling the captured alternate image for integration into at least one of the predefined areas of the first video content;

replacing at least one of said predefined areas of said first video content with said scaled alternate image; and replacing a remaining matte area within said one of said predefined areas of said first video content by cloning adjacent background pixels for preventing variations in between contours of said scaled alternate image and said matte area, said metadata including at least one of time-stamped information regarding the positioning of imaged objects of predefined areas in the first video content, the angle and positioning of the imaged objects relative to an imaging device, the placement and angle of the imaging device, environmental conditions, and lighting position and intensity during imaging of the of predefined areas of the first video content, such that said alternate image is captured using the same parameters as a predefined area of said first video content it is to replace, said metadata further including time-stamped information for each of the predefined areas in the first video content able to be replaced with alternate image content.

5. The apparatus of claim 4, wherein said apparatus is further configured to control the positioning of an imaging device for capturing the alternate image.

6. The apparatus of claim 4, wherein said apparatus is further configured to control the positioning of an imaged object when capturing the alternate image.

7. The apparatus of claim 4, wherein said apparatus is further configured to control environmental conditions when capturing the alternate image.

8. The apparatus of claim 7, wherein said environmental conditions include at least one of lighting positioning, lighting intensity and environmental temperature.

9. A system for alternate image insertion, comprising:

at least one imaging device for capturing images; and a processing and control unit in communication with said at least one imaging device, said processing and control unit comprising a processor and a memory and configured to perform the steps of:

storing metadata associated with a capture of predefined areas of a first video content that are able to be replaced with alternate image content;

creating time-stamped information for the predefined areas in the first video content capable of being replaced;

capturing an alternate image using the stored metadata associated with the first video content;

scaling the captured alternate image for integration into at least one of the predefined areas of the first video content;

replacing at least one of said predefined areas of said first video content with said scaled alternate image; and replacing a remaining matte area within said one of said predefined areas of said first video content by cloning adjacent background pixels for preventing variations in between contours of said scaled alternate image and said matte area, said metadata including at least one of time-stamped information regarding the positioning of imaged objects of predefined areas in the first video content, the angle and positioning of the imaged objects relative to an imaging device, the placement and angle of the imaging device, environmental conditions, and lighting position and intensity during imaging of the of predefined areas of the first video content, such that said alternate image is captured using the same parameters as a predefined area of said first video content it is to replace, said metadata further including time-stamped information for each of the predefined areas in the first video content able to be replaced with alternate image content.

10. The system of claim 9, wherein said processing and control unit is further configured to control the positioning of said at least one imaging device according to the stored metadata associated with the capture of said first video content, when capturing the alternate image.

11. The system of claim 9, wherein said processing and control unit is further configured to control the positioning of objects to be imaged when capturing the alternate image.

* * * * *